United States Patent
Zhang et al.

(10) Patent No.: US 7,145,613 B2
(45) Date of Patent: Dec. 5, 2006

(54) ELECTRONIC DEVICE AND METHOD FOR FABRICATING THE SAME

(75) Inventors: Hongyong Zhang, Atsugi (JP); Masayuki Sakakura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 172 days.

(21) Appl. No.: 10/848,146

(22) Filed: May 19, 2004

(65) Prior Publication Data

US 2004/0214359 A1 Oct. 28, 2004

Related U.S. Application Data

(62) Division of application No. 09/134,547, filed on Aug. 17, 1998, now Pat. No. 6,757,032.

(30) Foreign Application Priority Data

Aug. 20, 1997 (JP) .................................. 9-240505

(51) Int. Cl.
*G02F 1/136* (2006.01)
*G02F 1/13* (2006.01)

(52) U.S. Cl. ........................................ 349/44; 349/187

(58) Field of Classification Search .................. 349/44, 349/187
See application file for complete search history.

(56) References Cited

U.S. PATENT DOCUMENTS

| 5,877,832 | A | * | 3/1999 | Shimada ..................... 349/138 |
| 6,057,896 | A | | 5/2000 | Rho et al. |
| 6,115,094 | A | | 9/2000 | Fukunaga |
| 6,163,055 | A | | 12/2000 | Hirakata et al. |
| 6,175,395 | B1 | | 1/2001 | Yamazaki et al. |
| 6,243,146 | B1 | | 6/2001 | Rho et al. |
| 6,323,932 | B1 | | 11/2001 | Zhang et al. |
| 6,330,047 | B1 | | 12/2001 | Kubo et al. |
| 6,424,388 | B1 | | 7/2002 | Colgan et al. |

* cited by examiner

*Primary Examiner*—Toan Ton
(74) *Attorney, Agent, or Firm*—Eric J. Robinson; Robinson Intellectual Property Law Office, P.C.

(57) ABSTRACT

An electronic device having a long life and high quality pixel unit, said electronic device comprising a plurality of active elements, an insulator layer which covers the plurality of active elements, and a pixel region having placed thereon a plurality of pixel electrodes and being formed on the insulator layer, wherein, the insulator layer comprises a groove portion having an opening which is superposed on the interstice between the neighboring pixel electrodes, and said groove portion comprises an insulating light absorber buried therein.

8 Claims, 9 Drawing Sheets

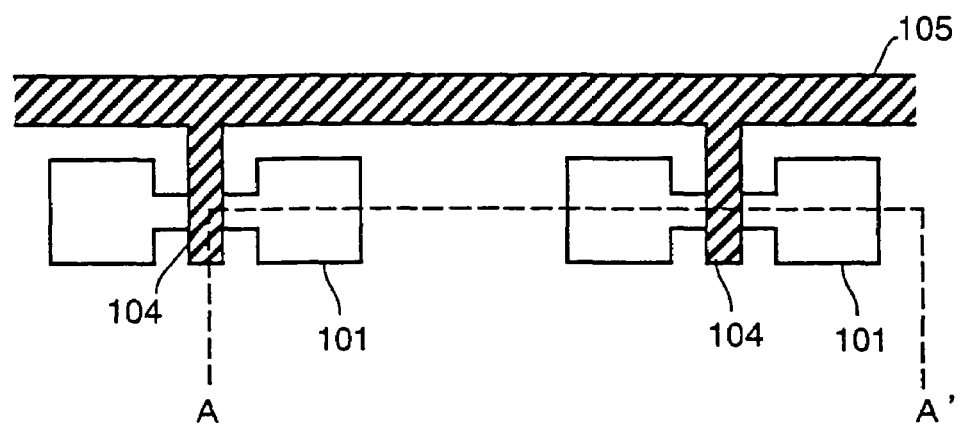
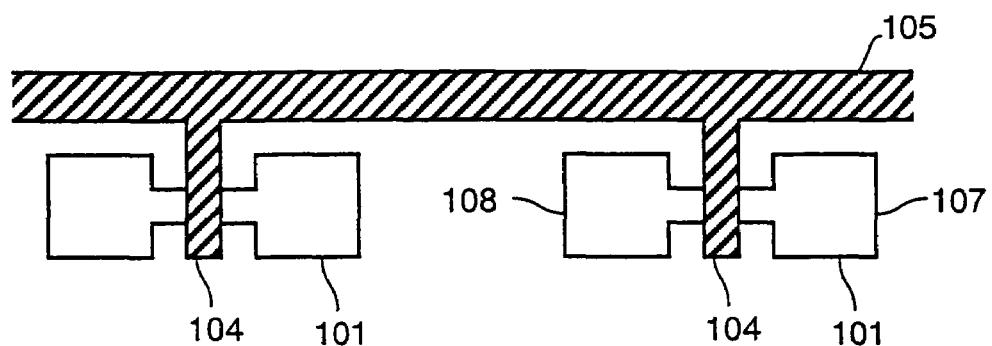
Fig. 2A
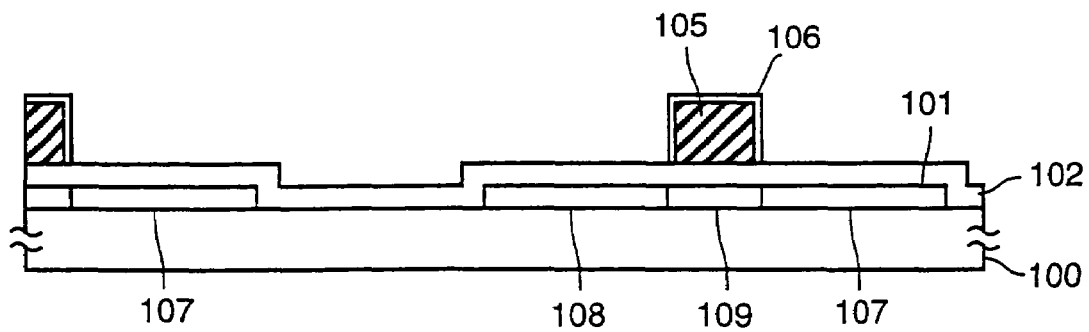
Fig. 2B

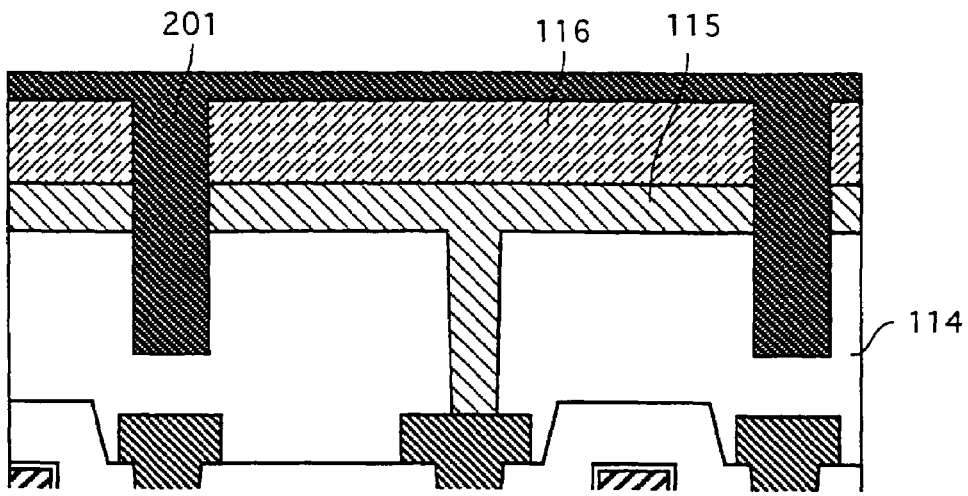
Fig. 7A    Formation of insulating layer 201
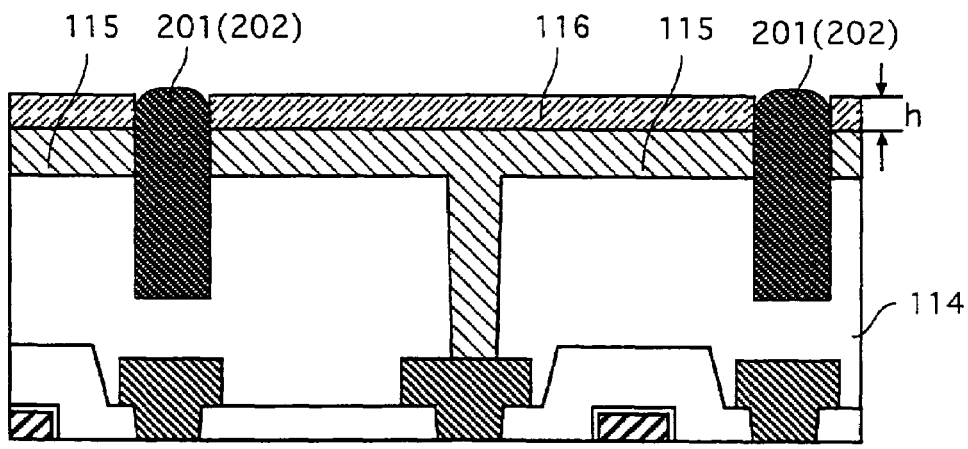
Fig. 7B    Dry etching step
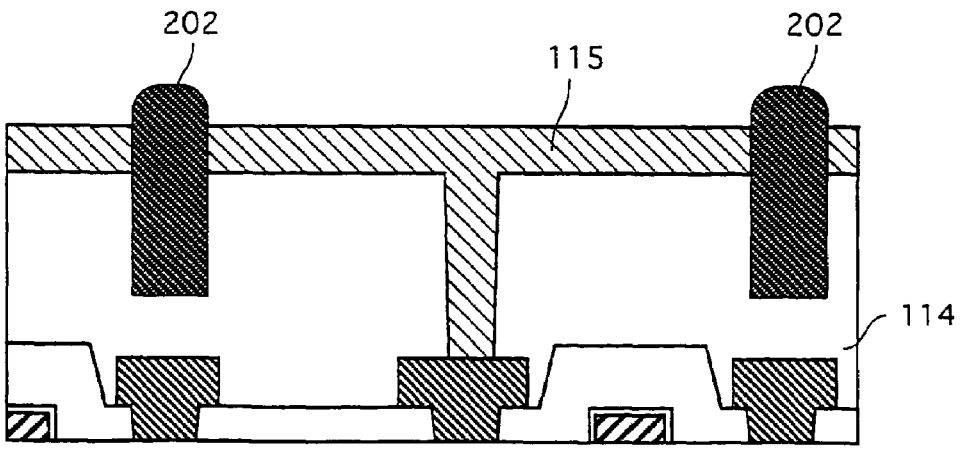
Fig. 7C    Removal of resist mask

ELECTRONIC DEVICE AND METHOD FOR FABRICATING THE SAME

BACKGROUND OF THE INVENTION

1. Field of the Invention

The present invention relates to electronic devices such as an active matrix panel having a pixel unit comprising a plurality of pixel electrodes, cellular phone having a pixel unit, personal computers, etc., and to a method for fabricating the same.

2. Prior Art

In the field of information systems, flat panel displays such as liquid crystal panels, which converts an electric signal (image signal) into an optical signal to display images, are attracting much attention. In order to implement full color displays and animated image displays, matrix drive system is employed as the display method for the flat panel displays.

FIG. 9 shows a cross section view of a pixel unit of a conventional reflection type active matrix liquid crystal display. Shown in FIG. 9 is a cross section diagram corresponding to a substrate known as a so-called TFT substrate. Referring to FIG. 9, a thin film transistor (TFT) 2 is formed per each of the pixels provided on the insulating surface of a substrate 1. The TFT 2 comprises an active layer 3, a gate insulating film 4, a gate electrode 5, and a source electrode 6 and a drain electrode 7 connected to source/drain regions of the active layer 3.

The gate electrode 5, the source electrode 6, and the drain electrode 7 are each insulated and isolated from each other by a first interlayer insulating film 8. A second interlayer insulating film 11 is provided in such a manner to cover the source electrode 6 and the drain electrode 7. A black matrix 12 is formed on the second interlayer insulating film 11, and a third interlayer insulating film 13 is formed in such a manner that it covers the black matrix 12. A pixel electrode (reflecting electrode) 14 is connected to the drain electrode 7 of the TFT 2 via contact holes formed in the second and the third interlayer insulating films 11 and 13.

After the process steps such as the formation of an orientation film and rubbing treatment, a substrate having an opposing electrode formed thereon is adhered to the element substrate shown in FIG. 9. Thus, a cell assembly for a reflection type liquid crystal display device is completed by incorporating a liquid crystal material sealed between the substrates.

Although it appears in FIG. 9 that the black matrix 12 is cut and separated, actually, it is formed monolithically on the interlayer insulating film 11 in a lattice-like structure, such that it clogs the interstice (space) 20 between the neighboring pixel electrodes. Thus, the black matrix 12 functions as a shield against a light incident from the interstice 20 of the pixel electrodes.

Recently, further increase in the number of pixels and higher density are required in the market of display devices such as a HDTV (high definition TV), a SXGA display, a photograph negative reader, and the like. Accordingly, much progress is being made to achieve pixels provided at finer pitches. However, as the pitches between the pixels become finer, the ratio of the interstices of pixel electrodes becomes relatively wider. Thus, the problems attributed to the interstices of the pixel electrodes are found to become no longer negligible.

A first problem which occurs due to the interstice of the pixel electrodes is described below. Referring to the reflection system panel of a conventional type shown in FIG. 9, the black matrix 12 is generally formed by a metallic material. Thus, when an incident light 30 is incident from the interstice 20 of the pixel electrodes, irregular reflection may undesirably occur due to the presence of black matrix 12, or furthermore, due to the pixel electrode 14. If such an irregularly reflected light 31 (indicated by an arrowhead) is irradiated to TFT2, TFT2 may undergo degradation or generate cross talk. Moreover, as is illustrated by the case of an irregularly reflected light 32 (indicated by an arrowhead), if the light should be mixed with the reflected light from the pixel electrode 14, there occurs problems such as a drop in contrast, and particularly, a degradation of black level.

Then, a second problem is described. In case of a liquid crystal display device, the alignment of a liquid crystal molecule is interrupted by the stepped portion at the interstice 20 between the pixel electrodes. Since the cell gap in a transmission type panel is relatively thick as to yield a value in a range of from approximately 7 to 10 µm, the step difference (the thickness of the pixel electrode) accounts for a relatively low ratio in the cell gap. Thus, the irregularity in the alignment does not greatly influence the display.

However, in case of a reflection type liquid crystal panel, the cell gap is as small as in a range of from about 2 to 4 µm. Moreover, to disintegrate the coiling of liquid crystal molecules in case of ferroelectric or antiferroelectric liquid crystal panels, the cell gap therefor is set to be 2 µm or less. It can be understood that the cell gap is extremely narrow as compared with the case of transmission type liquid crystal panels. Thus, in these liquid crystal panels, because the step difference accounting for in the cell gap becomes larger, the effect of irregularity in liquid crystal molecules greatly influences the device as to impair the contrast.

Accordingly, an object of the present invention is to provide a long-life highly reliable electronic device equipped with a pixel unit capable of high image quality display by overcoming the aforementioned problems, and further, to provide a method for fabricating the same.

Thus, the aforementioned problem can be solved by an electronic device of a constitution comprising a plurality of active elements, an insulator layer which covers the plurality of active elements, and a pixel region having placed thereon a plurality of pixel electrodes and being formed on the insulator layer, wherein:

said insulator layer comprises a groove portion having an opening which is superposed on the interstice between the neighboring pixel electrodes; and said groove portion, or said groove portion and said interstice between said neighboring pixel electrodes, comprise(s) an insulating light absorber buried therein.

Furthermore, the problem above can be solved by a method for fabricating an electronic device comprising a plurality of active elements, an insulator layer which covers the plurality of active elements, and a pixel region having placed thereon a plurality of pixel electrodes and being formed on the insulator layer, which comprises:

a first step of forming said plurality of pixel electrodes on said insulator layer;

a second step of forming a groove portion by removing said insulator layer that is provided to the interstice between said neighboring pixel electrodes; and a third step of forming an insulating light absorber being buried in said groove portion.

Another constitution according to the method for fabricating an electronic device of the present invention comprises:

a first step of forming said plurality of pixel electrodes on said insulator layer;

a second step of forming a groove portion by removing said insulator layer that is provided to the interstice between said neighboring pixel electrodes;

a third step of forming an insulating light absorber which is buried in said groove portion and in the interstice between said pixel electrodes and which covers the surface of said plurality of pixel electrodes; and a fourth step of exposing the surface of said pixel electrodes by removing at least said light absorber covering the surface of said plurality of pixel electrodes.

A still other constitution according to the method for fabricating an electronic device of the present invention comprises:

a first step of forming said plurality of pixel electrodes by forming an electrically conductive film on said insulator layer, followed by forming a resist mask on said electrically conductive film and patterning said electrically conductive film;

a second step of forming a groove portion while leaving said resist mask remaining thereon by removing said insulator layer that is present in the interstice between said neighboring pixel electrodes;

a third step of forming an insulating light absorber which is buried in said groove portion and in the interstice between said pixel electrodes and which covers the surface of said resist mask; and a fourth step of exposing the surface of said pixel electrodes by removing at least said light absorber covering the surface of said resist mask and said resist mask.

BRIEF DESCRIPTION OF THE DRAWINGS

FIGS. 2A and 2B each show a front view and a cross section view as explanatory diagrams showing the step of fabricating the pixel unit according to Example 1 of the present invention;

FIGS. 7A to 7C each show a cross section view as explanatory diagrams showing the step of fabricating the pixel unit according to Example 3 of the present invention;

DETAILED DESCRIPTION OF THE INVENTION

Figure 1A:
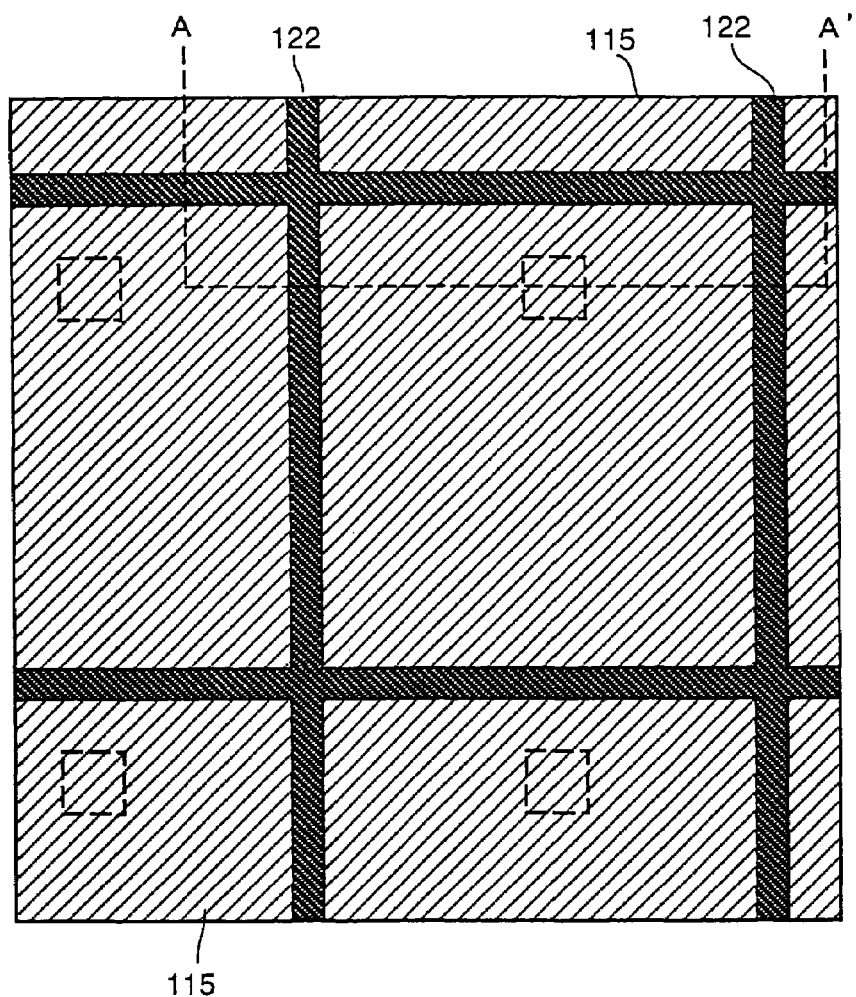
FIGS. 1A and 1B each show a front view and a cross section view of a pixel unit of a device according to Example 1 of the present invention.
Figure 1B:
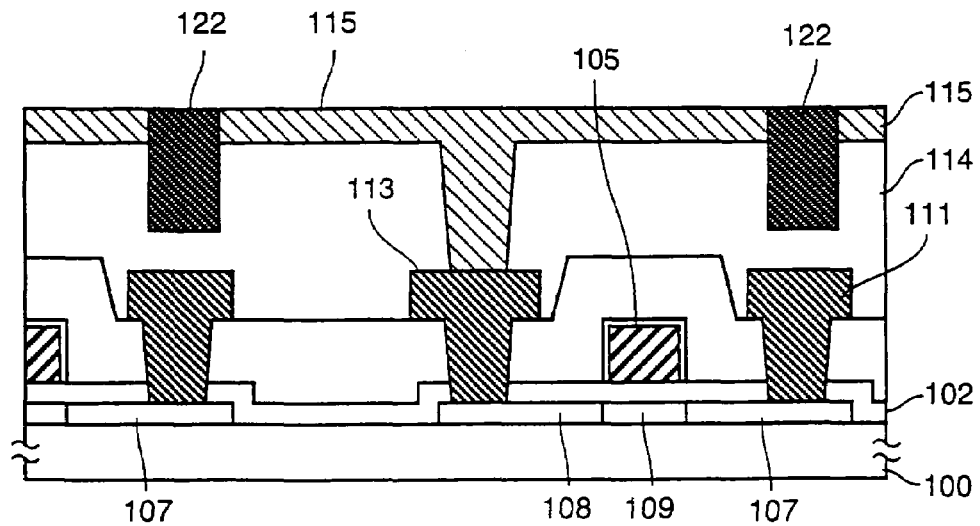

Referring to FIGS. 1A and 1B, an embodiment according to the present invention is described below. FIG. 1A shows a front view of the pixel unit according to an embodiment of the present invention, and FIG. 1B is the cross section view viewed along line A–A' shown in FIG. 1A.

Referring to FIG. 1B, TFTs are each formed as active elements per each pixel on a substrate 100. A TFT comprises an active layer having a source region 107, a drain region 108, and a channel region 109, a gate insulating film 102 which covers the active layer; furthermore, it comprises a gate electrode 105, a source electrode 111, and a drain electrode 113.

An interlayer insulating film 114 is further formed to cover the TFTs above. The drain electrode 113 of the TFT is connected to a pixel electrode 115 via the interlayer insulating film 114. The interlayer insulating film 114 comprises a groove portion formed therein at a portion that is superposed on the interstice between the neighboring pixel electrode 115. A light absorber 122 is buried in the groove portion and the interstice between the pixel electrodes 115 in such a manner that the light absorber 122 may provide a monolithic lattice like structure as is shown in FIG. 1A.

Figure 5A:
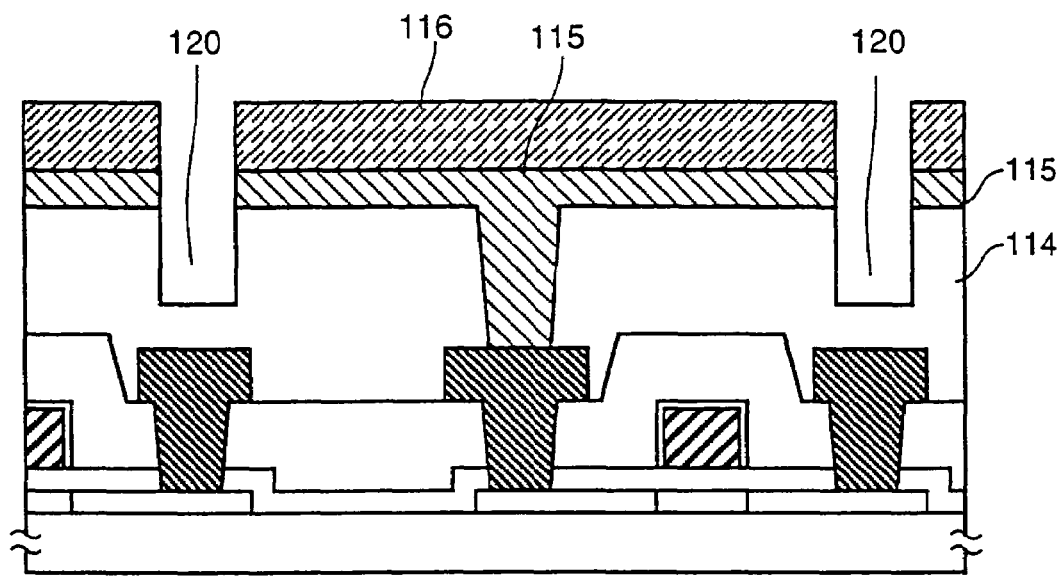
FIGS. 5A and 5B each show a cross section view as explanatory diagrams showing the step of fabricating the pixel unit according to Example 1 of the present invention.

In order to form the light absorber 122, the interlayer insulating film 114 is removed by etching to form a groove portion 120, in such a manner that the space is superposed on the interstice between the neighboring pixel electrodes 115 as is shown in FIG. 5A. By using the pixel electrode 115 in such a manner that it may function as an etching mask, the groove portion 120 is formed in a self-aligned manner, and the edge plane (cut off plane) of the pixel electrode 115 is formed as such that it may be on approximately the same plane with the side plane of the groove portion 120 of the interlayer insulating film 114.

Figure 5B:
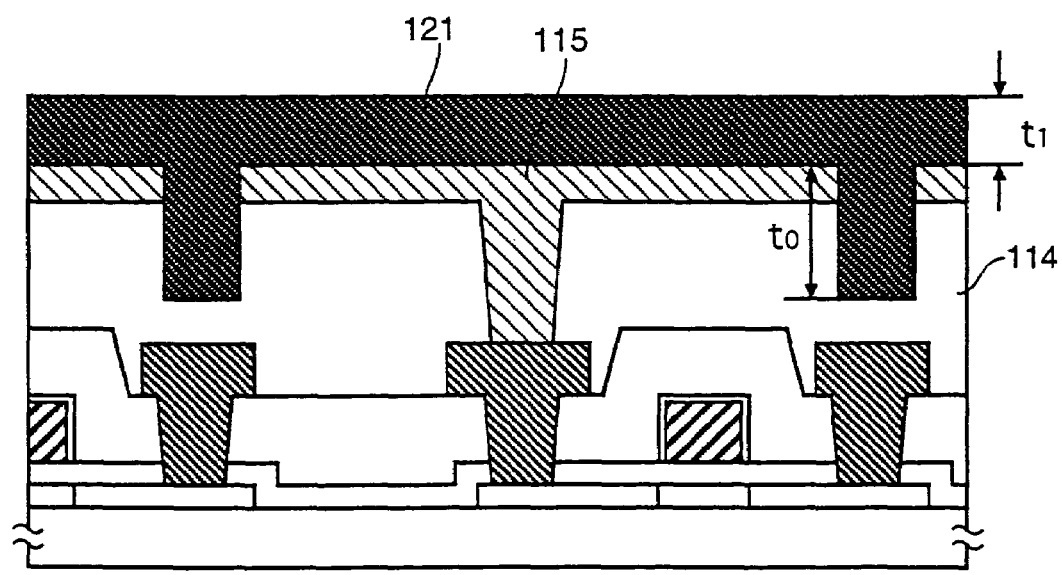

Then, referring to FIG. 5B, an insulating light absorber 121 is formed in such a manner that it may be buried in the groove portion 120 of the interlayer insulating film 114 and the interstice between the pixel electrodes, and that it may cover the surface of the plurality of pixel electrodes 115. Then, by means of dry etching or CMP, the optical absorber 121 covering the surface of the pixel electrodes 115 are removed to expose the surface of the pixel electrodes 115 as shown in FIGS. 1A and 1B. Thus, the groove portion of the interlayer insulating film 114 and the portion remaining in the interstice of the pixel electrode 115 functions as the light absorber shown in FIGS. 1A and 1B.

In the present embodiment, the fabrication process becomes simple because the groove portion in which the light absorber 122 is formed is provided in a self-aligned manner, and because the patterning step for the light absorber 122 can be omitted. Furthermore, the light absorber 122 can be formed without reducing the area (aperture ratio) of the pixel electrode 115.

According to the present embodiment, the light absorber 122 is provided at least at the groove portion formed in the interlayer insulating film 114. In this manner, reflection or transmission of the light incident from the interstice between the pixel units 115 can be prevented from occurring because it is absorbed by the light absorber 122 provided at the groove portion of the interlayer insulating film 114. That is, by forming the pixel electrode 115 by using a metallic material, light can be completed shielded by the pixel electrode 115 and the light absorber 122. Thus, optical degradation of the TFT can be avoided, and furthermore, the occurrence of cross talk can be suppressed.

By burying the groove portion of the interlayer insulating film 114 and the interstice between the pixel electrodes 115 with the light absorber 122, the stepped portion of a pixel electrode 115 can be eliminated. For instance, in case the pixel unit according to the present invention is applied to a liquid crystal panel, the occurrence of irregularities at the stepped portion of the pixel electrode 115 can be circumvented. More preferably, the surface of the pixel electrodes 115 is provided on approximately the same plane as that of the light absorber 122. In this manner, the alignment of the liquid crystal molecules between the substrates can be made uniform as to prevent discrimination from occurring.

Otherwise, the light absorber 122 can be provided protruded from the plane of the pixel electrodes. In this manner, the liquid crystal molecules that are arranged on the light absorber 122 becomes less sensitive to the electric field formed by the pixel electrode 115 and the electrode opposed thereto. Thus, a high quality display is made available because the response of the liquid crystal molecules on the pixel electrode 115 which contribute to the display is less disturbed.

The light absorber 122 is formed by a colored insulating material which absorbs light. Since the light absorber 122 is filled into the fine groove portion of the interstices of the pixel electrodes 115, most preferred as the material is a coated film which is formed by spin coating. For such a coating film, usable are organic resins selected from the group consisting of acrylic, polyimide, polyamide, polyamideimide, and epoxy resins; or silicon oxide based coated films such as PSG and $SiO_2$. Furthermore, to color these insulating materials, pigments or carbon based materials are dispersed in the insulating material.

The present invention is described in further detail below by making reference to specific examples and attached figures.

EXAMPLE 1

The present example refers to a case the invention is applied to a reflection type liquid crystal display device. FIGS. 1A and 1B show the constitution of the pixel unit according to the device of the present invention; FIG. 1A shows the front view, and FIG. 1B shows the cross section view taken along line A–A' indicated in FIG. 1A.

Referring to FIGS. 1A and 1B, a TFT is each formed as an active element per each pixel provided on a substrate 100 having an insulating surface. An interlayer insulating film 114 is formed in such a manner that it covers the TFTs. A drain electrode 113 of the TFT is connected to a pixel electrode 115 made of a metallic material via the interlayer insulating film 114. The interlayer insulating film 114 comprises a groove portion formed therein at a portion that is superposed on the interstice between the neighboring pixel electrodes 115. A light absorber 122 is buried in the groove portion and the interstice 115 between the pixel electrodes.

Referring to FIG. 1A, the light absorber 122 is provided monolithically and in a lattice-like structure to prevent light from intruding through the interstice between the pixel electrodes 115. Thus, by referring to FIGS. 2A to 6B, the process for fabricating the pixel unit shown in FIGS. 1A and 1B is described below.

First, a substrate 100 having an insulating surface is prepared. A glass substrate or a quartz substrate is used for the substrate 100. In case a glass substrate is used, silicon oxide is preferably formed on the surface of the glass substrate as a base insulating film, so as to prevent diffusion of impurities such as sodium ions and the like from occurring.

Then, on the substrate 100, an active layer 101 of the TFT is each provided per each pixel. To obtain the active layer 101, a 40 to 100 nm thick amorphous silicon, more specifically, a 50 nm thick amorphous silicon in this case, was formed, which was then turned into a polycrystalline film, and the polycrystalline silicon was isolated into island-like portions to form the active layer 101. To control the threshold value, the active layer 101 was doped with boron. Then, silicon oxide film which functions as a gate insulating film 102 was formed on the entire substrate. The thickness of the silicon oxide film was 120 nm.

An electrically conductive film which constitutes the gate electrode and line was formed on the gate insulating film 102. In the present example, a 400 nm thick aluminum film, into which a trace quantity of scandium (Sc) was added, was formed. The aluminum film was patterned to obtain a gate electrode 104 and a gate line 105. The gate electrode 104 was formed monolithically with the gate line 105 in such a manner that the gate electrode appears to be extended from the line 105.

Anodic oxidation treatment was performed thereafter by using the gate electrode and line 104 and 105 as the anode to form an anodic 30 oxide film 106 on the surface thereof. The anodic oxide film 106 has such a function to electrically and physically protect the gate electrode and line 104 and 105. It should be noted that in FIG. 2A, the anodic oxide film 106 is omitted.

Then, phosphorus ions are doped into the active layer 101 by using ion doping. Because the gate electrode 104 functions as a mask, a source region 107, a drain region 108, and a channel region 109 are formed in a self-aligned manner. After the completion of doping, laser irradiation or heat treatment is performed to activate the doped phosphorus and to anneal the active layer which had suffered damage due to doping.

Figure 3A:
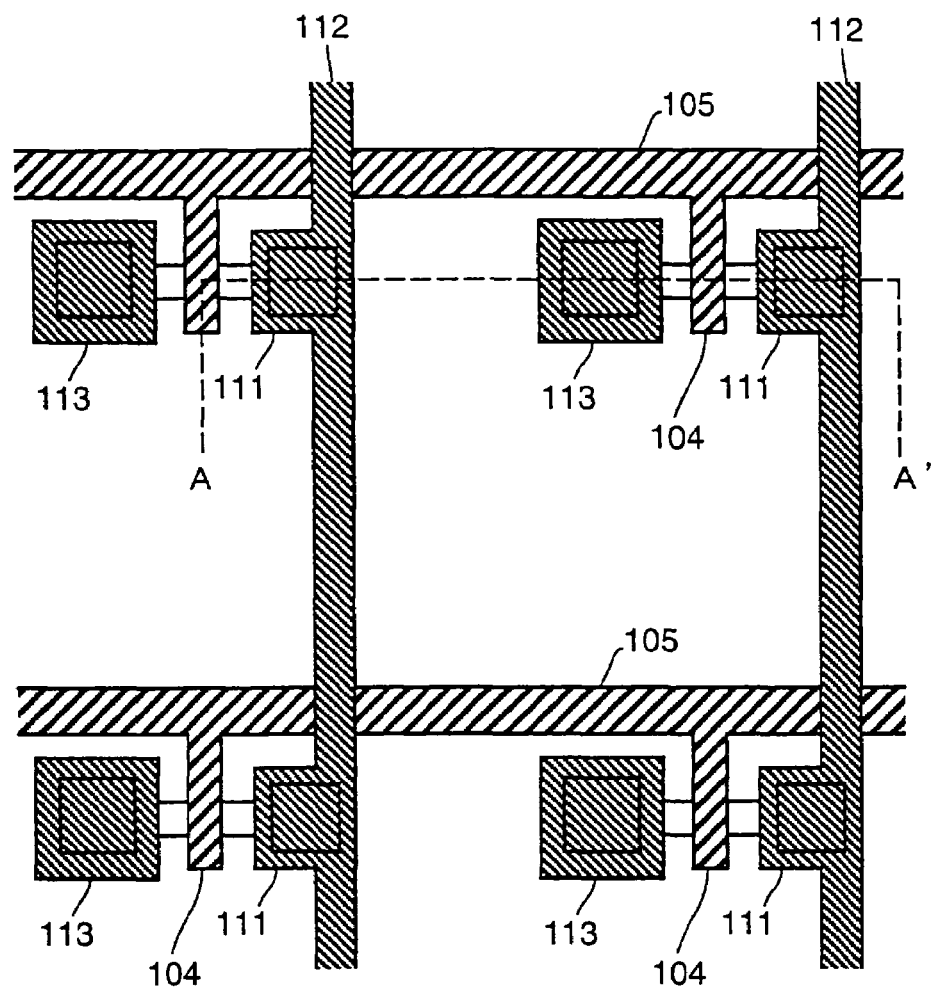
FIGS. 3A and 3B each show a front view and a cross section view as other explanatory diagrams showing the step of fabricating the pixel unit according to Example 1 of the present invention.

FIG. 2A shows the upper planar view of the pixel unit, and FIG. 2B shows the cross section view taken along line A–A' indicated in FIG. 2A. The subsequent process steps are explained below by making reference to FIGS. 3A and 3B. FIG. 3A shows the upper planar view of the pixel unit, and FIG. 3B shows the cross section view taken along line A–A' indicated in FIG. 3A.

Figure 3B:
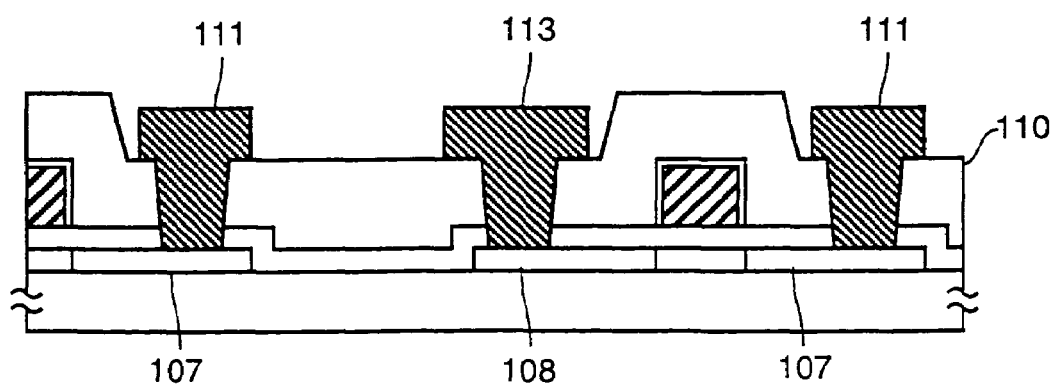

Referring to FIG. 3B, a first interlayer insulating film 110 is formed. In the present example, a 20 nm thick silicon nitride film is formed by plasma CVD, and a 800 nm thick silicon oxynitride film is formed in continuation thereto. Then, contact holes which reach source/drain regions 107 and 108 are perforated in the interlayer insulating film 110.

A layered film consisting of titanium film, aluminum film, and titanium film in this order (referred to hereinafter simply by Ti/Al/Ti film) is formed thereafter. The titanium films are formed 100 nm thick each, and the aluminum film is provided at a thickness of 300 nm. The layered film is patterned to form each of a source electrode 111, a source line 112, and a drain electrode 113. The source electrode 111 is formed monolithically with the source line 112 so that it may appear extended from the line 112. A complete TFT for a pixel unit is obtained by this step.

Figure 4A:
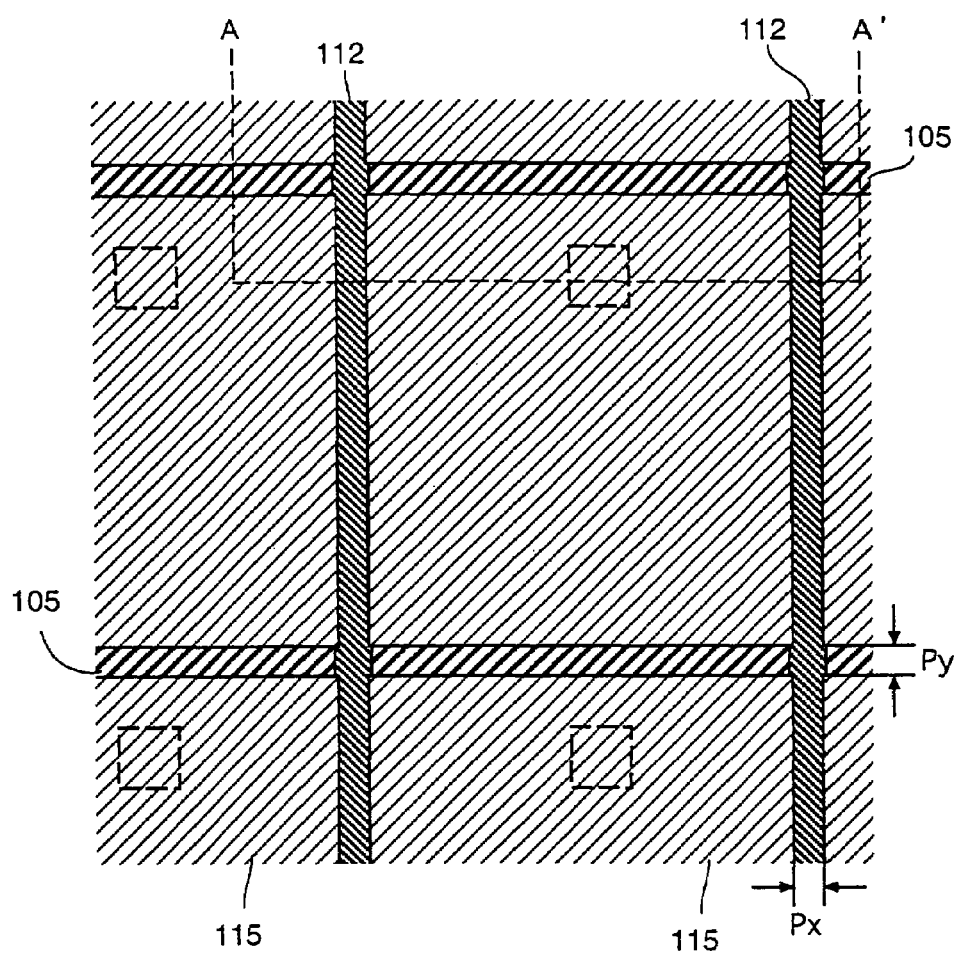
FIGS. 4A and 4B each show a front view and a cross section view as still other explanatory diagrams showing the step of fabricating the pixel unit according to Example 1 of the present invention.
Figure 4B:
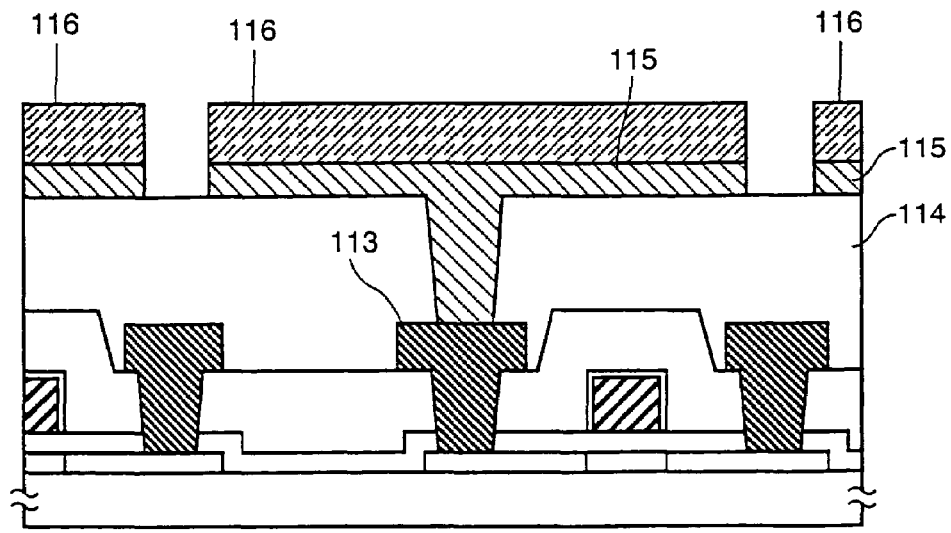

The subsequent process steps are explained below by making reference to FIGS. 4A and 4B. FIG. 4A shows the upper planar view of the pixel unit, and FIG. 4B shows the cross section view taken along line A–A' indicated in FIG. 4A.

Referring to FIG. 4A, a second interlayer insulating film 114 which covers the TFT is formed at a thickness of from 1 to 2 μm. In the present example, a 1.5 μm thick acrylic resin film is formed as the interlayer insulating film 114.

As a material of the interlayer insulating film 114, preferred is an organic resin film. Because an organic resin film can be formed by applying a solution according to spin coating method, a film having a flat surface can be obtained by canceling out the irregularities that are present in the underlying layer. As such a coating film, usable are organic resins selected from the group consisting of acrylic, polyimide, polyamide, polyamideimide, and epoxy resins; or silicon oxide based coated films such as PSG and $SiO_2$.

Then, a contact hole which reaches the source region 113 is perforated in the interlayer insulating film 114. A metallic film which constitutes the pixel electrode 115 is formed thereafter. An aluminum film was formed at a thickness of from 200 to 400 nm; specifically in this example, a 300 nm thick film was formed by means of sputtering. Subsequently, a resist mask 116 for use in patterning was formed on the aluminum film. The aluminum film was patterned by using this mask 116 to form a pixel electrode 115. It should be noted that the resist mask 116 is omitted from the view shown in FIG. 4A.

The pixel electrodes 115 are each connected pixel by pixel to the drain electrode 113 of the TFT, and are arranged in a matrix by taking a distance (pitch) of $P_x$ and $P_y$ in the X and Y directions, respectively, from each other. The distances $P_x$ and $P_y$ are set in accordance only with the design rule which provides the maximum aperture, and are generally set in a range of from about 1 to 3 μm. More specifically in this case, the distances $P_x$ and $P_y$ are each set at 2 μm.

Then, referring to FIGS. 5A and 5B, the pixel electrodes 115 are used for an etching mask to form a groove portion 120 in a self-aligned manner in the second interlayer insulating film 114. The groove portion 120 is formed by means of dry etching such as plasma etching and RIE (reactive ion etching). In the present example, plasma etching was employed by using a mixed gas of $O_2$ and $CF_4$ as the etching gas. The concentration of $CF_4$ is about 1 to 10% with respect to the entire gas. The etching rate can be controlled by changing the conditions such as the concentration and the pressure of $CF_4$. Furthermore, to protect the surface of the pixel electrode 115 from the attack of the etching gases, the resist mask 116 is left over during the etching process.

Specifically in the present example, plasma etching using an etching gas having a $CF_4$ concentration of 5% was employed to form the groove portion 120 by removing about 1 μm deep of the second interlayer insulating film 114 provided in the interstice of the pixel electrodes 115. Referring to the cross section view of FIG. 5A, the groove portion 120 appears to be isolated to independent parts, but in fact, the groove portion 120 is formed monolithically in a form of a matrix in such a manner that it may be superposed on the interstices of the pixel electrode 115.

Referring to FIG. 5B, after the resist mask 116 is stripped off, an insulator layer 121 is formed, which is filled inside the groove portion 120 and the interstices of the neighboring pixel electrodes 115, and which covers the surface of the pixel electrodes 115. In the present example, an acrylic resin containing dispersed therein a black pigment was applied by spin coating and cured. Thus, an insulator layer 121 made of black colored acrylic resin was provided.

The groove portion 120 formed above is 1 μm in depth and 2 μm in width. To fill such a fine lattice-like pattern over the entire pixel unit with the insulator layer 121, the insulator layer 121 is a coated film which allows its formation from a solution. For such coated films, usable are organic resins such as acrylic, polyimide, polyamide, polyamideimide, and epoxy resins. The acrylic resin used in the present example is advantageous in that it is lower in dielectric constant as compared with that of a liquid crystal material, and that it is the least expensive of the enumerated resins. Also films which can be formed from a solution include silicon oxide based coated films such as PSG and $SiO_2$.

In the insulator layer 121 above, black pigment was dispersed to impart a light shielding function as was the case with the black matrix of the conventional type. The material to be dispersed need not be black pigment, and also usable are carbon based materials. Furthermore, the pigment is not only limited to black colored pigments, and there is no restrictions concerning color so long as the insulator layer 121 absorbs light.

Then, the insulator layer 121 which covers the surface of the pixel electrodes 115 is removed by a dry etching treatment such as $O_2$ ashing in order to leave the insulator layer 121 only in the interstices of the neighboring electrodes 115 and the groove portion 120 as is shown in FIG. 1B. The insulator layer 121 left over after this step becomes the light absorber 122. Referring to FIG. 1B, the light absorber is cut at places and separated, but in an actual device, the light absorber 122 fills the interstices of the pixel electrodes 115 to make a monolithic lattice like structure as is shown in FIG. 1A.

In the process according to the present example, $O_2$ ashing is used to form the light absorber 122. Concerning that the etching rate of ashing is representatively in a range of approximately from 0.3 to 1 μm/minute, the thickness $t_1$ of the insulating layer covering the pixel electrodes 115 as shown in FIG. 5B is set to fall approximately in a range of from 0.3 to 1.5 μm. The thickness $t_1$ can be controlled by the speed of rotation of the spinner upon forming the insulator layer 121 and the density, etc., of the starting solution for the insulator layer 121.

Furthermore, to avoid loss from occurring on the reflectance of the pixel electrodes 121, the insulator layer 121 which covers the surface of the pixel electrodes 115 must be completely removed by $O_2$ ashing. However, to leave over at least the insulator layer 121 (the portion which later becomes the light absorber 122) buried in the groove portion 120, the insulator layer 121 prior to completely removing the insulator layer 121 covering the surface of the pixel electrodes 115 is provided at such a thickness that the thickness to, i.e., the thickness of the light absorber 122 or the total thickness obtained by adding the thickness of the pixel electrodes 115 and the depth of the groove portion 120, is set thicker than the thickness $t_1$ corresponding to the thickness of the insulator layer 121 that is removed by ashing. In this manner, a margin of etching can be assured so that the insulator layer 121 buried in the interstices of the pixel electrodes 115 and the groove portion 120 can be left over.

Referring to FIG. 5B, to is 1.3 μm; that is, it corresponds to the sum of the thickness 1 μm of the groove portion 120 and the thickness 300 nm of the pixel electrode. Specifically in this case, the thickness $t_1$ of the insulator layer 121 to be removed was 0.5 μm.

In the present example, the groove portion 120 was formed in a concave shape in the insulator layer 114. However, it can be formed in such a manner that it penetrates the insulator layer 114. In this manner, the depth $t_0$ can be easily increased. In this case, the groove portion 120 is formed along the lattice (see FIG. 4A) formed by a gate line 105 and a source line 112. Thus, if the groove portion penetrates the insulator layer 114, the surface of the source line 112 is exposed to the etching gas. In this case, the surface of the source line 112 must be made of a material which remains intact to the attack of the etching gas.

Because the distances (pitch) between the neighboring pixel electrodes $P_x$ and $P_y$ are about 1 to 3 μm in length, little plasma enters into the interstices of the pixel electrodes 115 at the, ashing step, and hence, the insulator layer 121 is rarely removed. Accordingly, by ashing, it is possible to maintain the insulator layer 121 left buried inside the interstices of the pixel electrodes 115 and the groove portion 120 while removing the insulator layer 121 that is formed on the surface of the pixel electrodes 115. The insulator layer 121 that is left over corresponds to the light absorber 122 shown in FIGS. 1A and 1B.

Referring to FIGS. 1A and 1B, the surface of the light absorber 122 is drawn in such a manner that it matches with the pixel electrodes 115, however, in fact, as described above, it is necessary to completely remove the insulator layer 121 that is formed on the surface of the pixel electrodes 115 during the $O_2$ ashing step. Thus, occasionally, there are cases in which a part of the insulator layer 121 provided in the interstices of the pixel electrodes 115 is removed, as is shown by 150 in FIG. 6A. However, as is shown in FIG. 5A, even in case the height of the surface of the optical absorber should be lower than that of the surface of the pixel electrodes 115, the light passing through the interstices of the pixel electrodes 115 can be shielded by the light absorber 122.

That is, to shield the light passing through the interstices of the pixel electrodes 115, at least the side planes and the bottom plane of the groove portion 120 is covered by the light absorber 122. Thus, to completely remove the insulator layer 121 covering the surface of the pixel electrodes 115, the insulator layer 121 provided on the interstices of the pixel electrodes 115 can be removed almost completely as is shown by 160 in FIG. 6B.

After completing the pixel unit shown in FIGS. 1A and 1B by forming the light absorber 122, a reflection type liquid crystal display device is implemented by a known cell assembly process. The liquid crystal material for use in the cell is properly selected from paraelectric liquid crystals, ferroelectric liquid crystals, antiferroelectric liquid crystals, etc., depending on the display mode.

In the present example, the light absorber 122 consists of an acrylic resin containing black pigment dispersed therein. Thus, no irregular reflection occurs on the surface. Since the light which contributes to the display is then restricted to the light reflected by the pixel electrodes 115, a display having high contrast can be realized.

Moreover, because the light does not pass through the light absorber 122, and because the pixel electrodes 115 are made of a metal, optical degradation of TFTs can be prevented from occurring; the TFTs are completely shielded from the irradiation of light by the presence of the pixel electrodes 155 and the light absorber 122.

By burying the light absorber 122 into the interstices of the pixel electrodes 115, the step (height) difference of the pixels 115 can be reduced. As a result, the disordering in the alignment of liquid crystal molecules at the stepped portion of the pixel electrodes 115 can be suppressed. This effect is available not only in reflection type display devices, but also in transmission type ones. In the case of a transmission type display device, it is necessary to form, in addition to the light absorber 122, a black matrix to shield the active layer of the TFTs from light. in the present example, the groove portion, into which the light absorber 122 is buried, is formed in a self-aligned manner, and no patterning step is required for the light absorber 122. Thus, the process steps can be simplified. Moreover, the device can be formed without impairing the aperture ratio.

EXAMPLE 2

In the process of Example 1, dry etching was employed in the step of forming the light absorber 122 to remove the unnecessary insulator layer 121 covering the surface of the pixel electrodes 115. The present example refers to a case using CMP (chemical mechanical polishing) as a means of removing the unnecessary insulator layer 121.

First, a structure shown in FIG. 5B is fabricated in accordance with a process similar to that described in Example 1. Then, the unnecessary insulator layer 121 covering the surface of the pixel electrodes 115 is polished and removed by CMP. The conditions of CMP such as the type of slurry and the number of rotation of the polisher cloth are set as such that the insulator layer 121 is polished but that the pixel electrodes 115 remain unpolished. In this manner, CMP can be finished at the point the surface of the pixel electrodes 115 is exposed.

To accomplish the process above, the hardness of the surface of the pixel electrodes 115 and that of the insulator layer 121 are set to have a difference as large as possible. For instance, in case the pixel electrodes 115 are made of aluminum, as in Example 1, the surface thereof is oxidized by anodic oxidation and the like to form alumina.

EXAMPLE 3

Referring to the explanatory diagrams shown in FIGS. 7A, 7B, and 7C for the fabrication of a light absorber according to the present invention, another process for fabricating the light absorber is described below. In FIGS. 7A to 7B, only a part of the TFT is shown. It should be noted that the members used in common with those described in reference to FIG. 1A through FIG. 5B have the same symbols attached thereto.

First, a structure shown in FIG. 5A is fabricated in accordance with a process similar to that described in Example 1. Then, as is shown in FIG. 7A, an insulator layer 201 is formed while leaving over the resist mask 116 that is used for patterning of the pixel electrodes 115. The insulator layer 201 is made of a colored insulating material, and it later constitutes the light absorber.

Similar to the case described in Example 1, the black acrylic resin insulator layer 201 is formed by means of spin coating comprising coating and curing an acrylic resin containing a black pigment dispersed therein. This step is employed in order to fill the groove portion 120 and the interstices of the pixel electrodes 115 with the insulator layer 201. It is also possible to use other organic resins such as polyimide, polyamide, polyamideimide, and epoxy resins, or silicon oxide based coated films such as PSG and $SiO_2$. Although black pigment was dispersed in the insulator layer 201 in this case, it is possible to disperse carbon based materials.

Then, the insulator layer 201 covering the surface of the pixel electrodes 115 is removed by a dry etching treatment such as $O_2$ ashing. By continuing etching, the insulator layer 201 filled in the interstices is removed together with the resist mask 116. The etching is stopped at the state at which the resist mask 116 is left over for a thickness h. The thickness h can be controlled by changing the duration of etching.

The structure shown in FIG. 7B comprises the insulator layer 201 remaining charged inside the groove portion 120, the interstices of the pixel electrodes 115, and the interstices of the resist mask 116. This functions as the light absorber 202. As is shown in FIG. 7C, the resist mask 116 alone is stripped off by using a special purpose stripper solution. As a result, the light absorber 202 is formed in such a manner that it is protruded from the surface of the pixel electrodes 115.

By providing the light absorber 202 protruded from the surface of the pixel electrodes 115, the liquid crystal molecules that are present on the light absorber 202 (on the interstices of the pixel electrodes 115) can be left beyond the action of the electric field formed by the pixel electrodes 115 that are present in the vicinity thereof. That is, the liquid crystal molecules that are present in-between the pixel electrodes 115 do not contribute to the display, and can be set as such that they do not respond to the pixel electrodes. In this manner, response failure of liquid crystal molecules that are present on the pixel electrodes 115 can be avoided as to implement a high quality image display.

Referring to FIGS. 7A to 7C, the process steps are particularly effective in case the etching rate for the insulator layer 201 is approximately the same to that of the resist mask 116, or to the case the etching rate for the insulator layer 201 is higher. By leaving over the resist mask 116 for a thickness h, the light absorber 202 can be provided protruded from the surface of the pixel electrodes 115.

On the other hand, it is possible to select the materials for the insulator layer 201 and the resist mask 116 in such a manner that the etching rate for the latter would become higher. In such a case, etching is performed until the resist mask 116 is completely removed. At the point etching is completed, depending on the difference in etching rate, the insulator layer 201 can be left over in such a manner that it is protruded from the surface of the pixel electrodes 115. Furthermore, while it is possible to find out whether the resist mask 116 is completely removed or not by monitoring using the etching apparatus, the thickness h of the resist mask 116 that is left over is controlled by the duration of time and cannot be monitored. Thus, concerning controllability and reproducibility, it can be understood that complete removal of the resist mask 116 is superior to the case of finishing etching with the resist mask 116 left over.

Figure 6A:
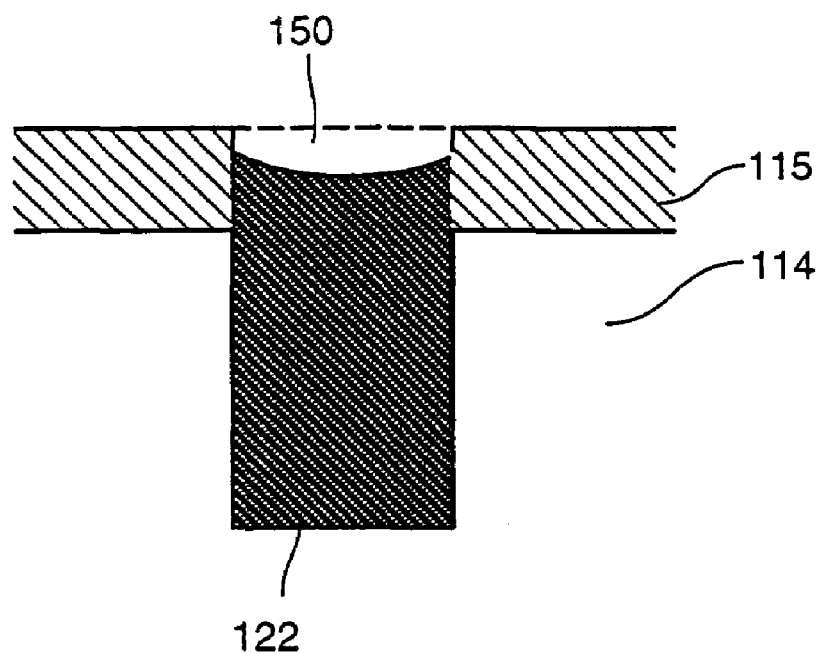
FIGS. 6A and 6B are each enlarged diagrams of the groove portion as explanatory diagrams showing the steps for fabricating light absorbers according to Example 1 of the present invention.
Figure 6B:
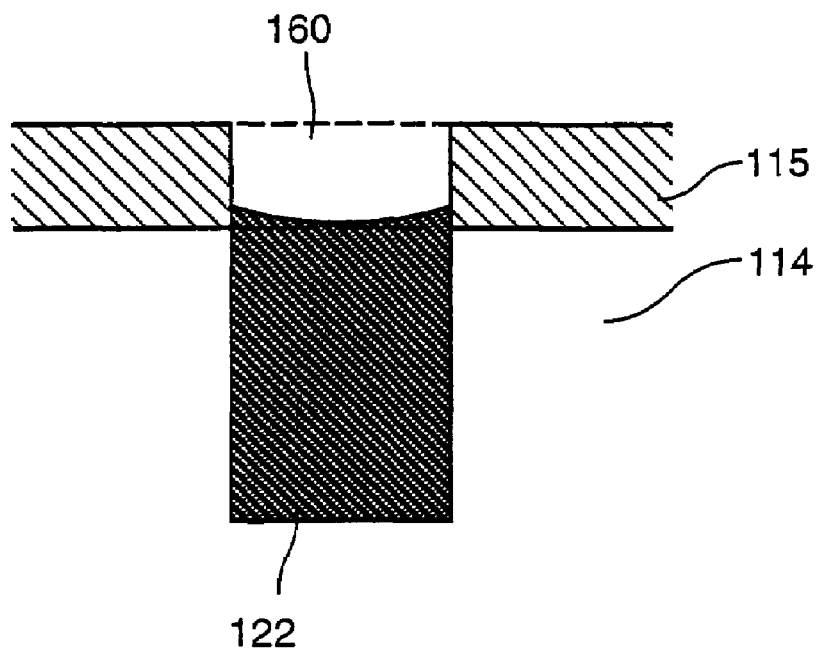

In the present example, the light absorber 202 was provided in such a manner that it should be protruded than the surface of the pixel electrodes 115. However, it is possible to completely remove the resist mask 116 by taking a longer time for etching, so that the surface of the light absorber 202 becomes approximately the same as that of the pixel electrodes 115. Referring to FIGS. 6A and 6B, etching can be continued as such that the resist mask 116 is etched to a greater degree to have indented surfaces 150 and 160 with respect to the surface of the pixel electrode 115, so long as the light absorber 202 is left at least in the groove portion 120 of the interlayer insulating film 114.

Otherwise, after the structure is fabricated to the stage shown in FIG. 7A, the light absorber 202 can be formed by the CMP process described in Example 2. In this case, the surface of the pixel electrodes 115 is exposed by polishing and removing the resist mask 116 together with the insulator layer 201.

In the Examples 1 to 3 above, the active elements of the pixel unit were formed by TFTs of top-gate type. However, the present invention is applicable not only to structures of this type, but also to other structures such as the TFTs of bottom-gate type and TFTs having other structures. Moreover, it is not only limited to TFTs, and are also applicable to diodes, MIM elements, etc.

Furthermore, in Examples 1 to 3 above, insulating glass or quartz was used for the substrate 100. However, single crystal silicon substrate can be used in case of forming a reflection type pixel unit. In such a case, a MOS type transistor is formed as an active element on the single crystal silicon substrate. By further using a single crystal silicon substrate, not only the light from the surface of the substrate can be cut off by the presence of pixel electrodes 115 and light absorber 122, but also the light incident from the back of the substrate can be shielded.

EXAMPLE 4

FIGS. 8A to 8F schematically shows the appearance of electronic apparatuses according to the present invention. The present example describes application products using the electronic device according to the present invention. Included in the electronic apparatuses as application products of the present invention are video cameras, still cameras, projectors, head mount displays, car navigation systems, personal computers, portable information terminals (i.e., mobile computers and cellular phones), etc.

Figure 8A:
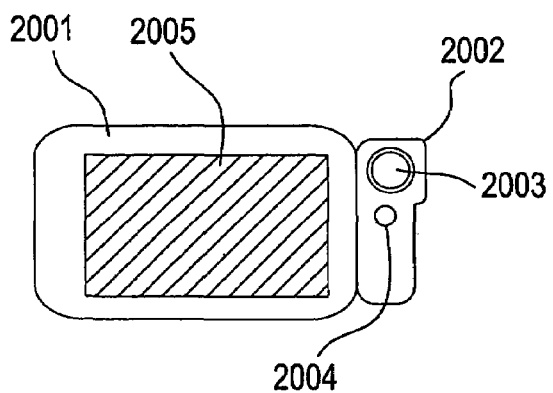
FIGS. 8A to 8F are each an explanatory diagram of application products using the electronic device according to Example 4 according to the present invention.

FIG. 8A shows a schematically drawn mobile computer, which comprises a main body 2001, camera unit 2002, an image receiver unit 2003, an operation switch 2004, and a reflection type liquid crystal display device 2005.

Figure 8B:
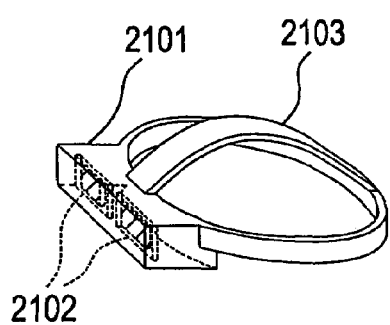

Referring to FIG. 8B, a head mount display comprises a main body 2101, a pair of reflection type liquid crystal display devices 2102, and a band 2103 to fix the body to the human head. Each of the pair of liquid crystal display devices displays the image for the left eye and that for the right eye separately. A user visualizes the image provided in this manner via an optical system. The user can then visualize the image as if it were displayed on a wide area display.

Figure 8C:
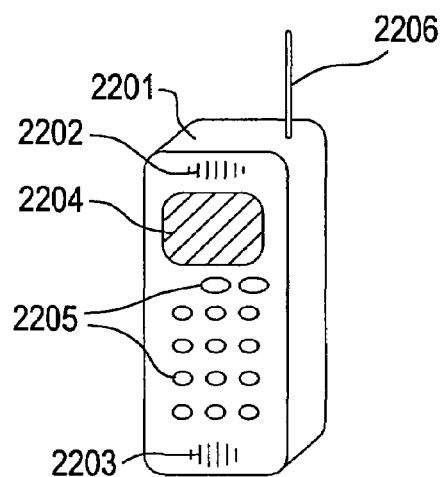

FIG. 8C shows a cellular phone, comprising a main body 2201, a voice output unit 2202, a voice input unit 2203, a reflection type liquid crystal display device 2204, an operation switch 2205, and an antenna 2206.

Figure 8D:
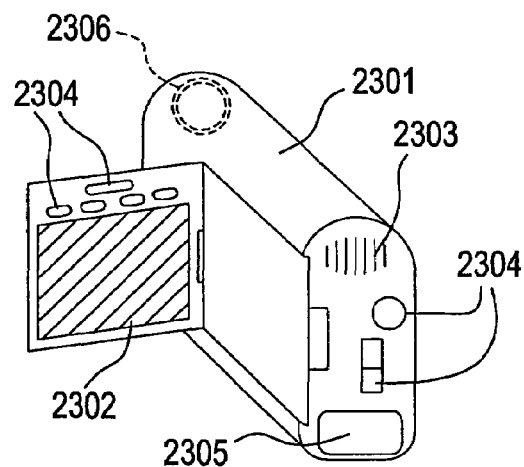

FIG. 8D shows a schematic of a video camera, comprising a main body 2301, a reflection type liquid crystal display device 2302, a voice input unit 2303, an operation switch 2304, a battery 2305, and an image receiver unit 2306.

Figure 8E:
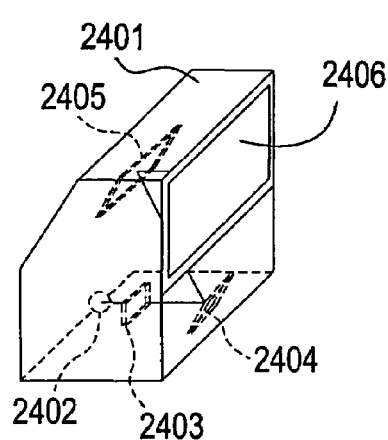

FIG. 8E shows a rear type projector, in which the light emitted from a light source 2402 placed inside a main body 2401 is reflected and modulated at the pixel unit of a reflection type liquid crystal display device 2403. The reflected light is further reflected by mirrors 2404 and 2405, and finally projected to a screen 2406 to be displayed as an image.

In the electronic apparatuses shown in FIGS. 8A to 8E, the pixel unit according to the present invention is included in the reflection type liquid crystal display devices 2005, 2102, 2204, 2302, and 2403, and the peripheral drive circuits for controlling the pixel unit are also formed on the same substrate as that of the pixel unit. The liquid crystal material for use in the application products is properly selected from ferroelectric liquid crystals, antiferroelectric liquid crystals, etc., depending on the display mode.

The structure of the pixel unit according to the present invention prevents optical degradation from occurring on the active elements. Thus, a device with longer life and higher reliability can be realized. In particular, the present invention is effective for electronic apparatuses in which the irradiation of intense light is utilized, such as the rear type projector shown in FIG. 8E.

Furthermore, because the undesirable refection light which originates from places other than the pixel electrodes can be eliminated, a display of high contrast and high quality can be realized. This effect is particularly effective in case of electronic apparatuses such as the rear type projector shown in FIG. 8E, in which the image is magnified to several tens to several hundreds of times and projected.

Moreover, because the height (step) difference of the pixel electrodes is removed or reduced by the use of a light absorber, the disordering of liquid crystal molecules at the stepped portion can be prevented from occurring. Thus, the problems attributed to the disordering in molecular alignment, such as the loss of contrast, and particularly, the defect in black display, can be overcome.

The effect of preventing disordering in the molecular alignment of liquid crystal molecules is particularly distinct in reflection type liquid crystal display devices having a cell gap in a range of approximately 2 to 4 µm, or in liquid crystal display devices having a cell gap of 2 µm or less and using a ferroelectric liquid crystal or an antiferroelectric liquid crystal. Particularly, in the case of the projector consisting of large number of pixels, and of pixels each being very fine, as is shown in FIG. 8E, the prevention of disordering in molecular alignment is very effective for the improvement of image quality. A projector having another constitution is shown in FIG. 8F.

Figure 8F:
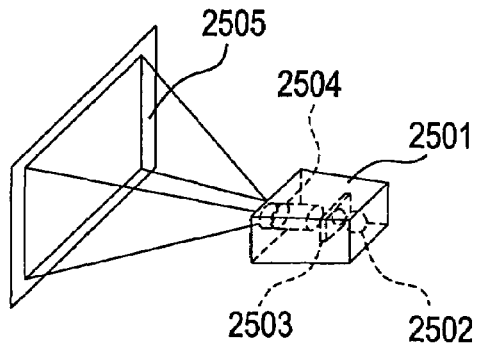
Figure 9:
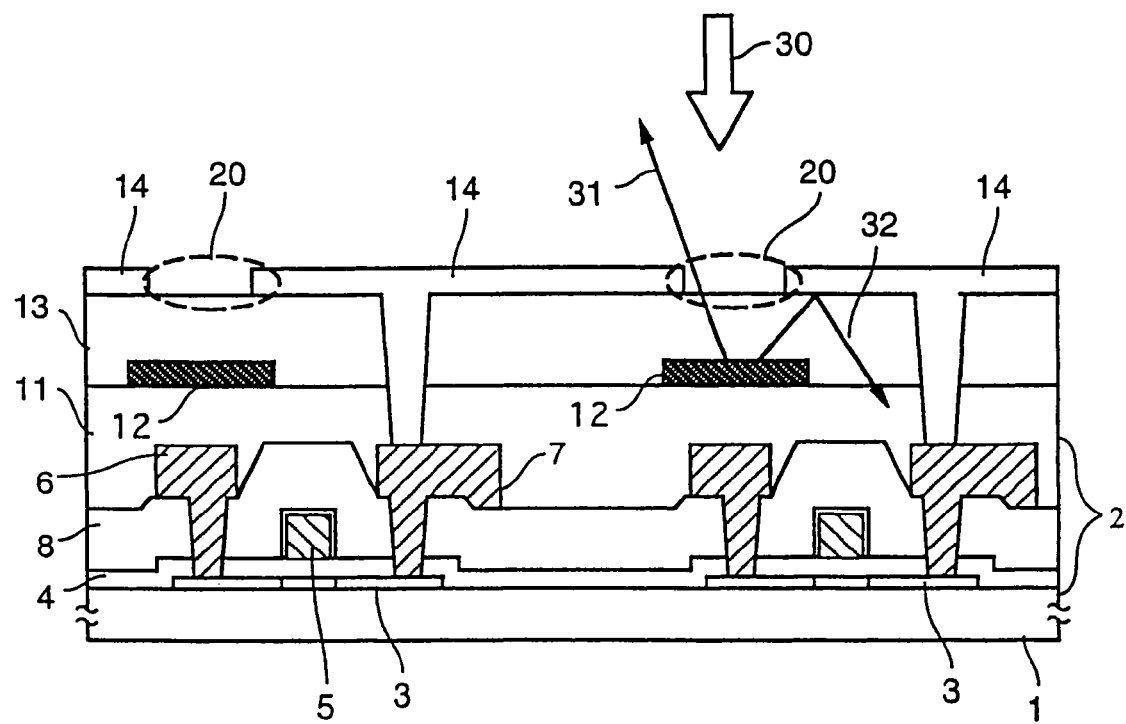
FIG. 9 shows a cross section view of a pixel unit of a conventional device.

Referring to FIG. 8F, the front type projector comprises a main body 2501, and the light emitted from a light source 2502 is modulated by a transmission type liquid crystal display device 2503 and transmitted. The transmitted light is then projected onto a screen 2505 by using an optical system 2504 to display an image. The pixel unit according to the present invention is employed in the transmission type display device 2503, and it realizes a high precision display.

Although description has been provided for liquid crystal display devices in the Examples 1 to 4 above, the pixel unit according to the present invention is applicable to other types of active matrix display devices such as EL (electroluminescent) display devices to prevent optical degradation from occurring on the active elements incorporated in the pixel units.

The constitution according to the present invention comprises a light absorber being buried in the groove portion formed on the interstices of the pixel electrodes. By using this constitution, the light incident from the interstices of the pixel electrodes can be completely cut off. In particular, by constructing the pixel electrodes with a metallic film, light can be completely shielded by the pixel electrodes and the light absorber. Thus, the constitution prevents optical degradation from occurring on the active elements, and avoids cross talk.

Furthermore, because the groove portion is formed in a self-aligned manner, and because the patterning process for the light absorber is unnecessary, the fabrication process can be simplified without impairing the aperture ratio.

What is claimed is:

1. A method for fabricating an electronic device comprising a plurality of active elements, an insulator layer which covers the plurality of active elements, and a pixel region having placed thereon a plurality of pixel electrodes and being formed on the insulator layer, which comprises:
    a first step of forming said plurality of pixel electrodes by forming an electrically conductive film on said insulator layer, followed by forming a resist mask on said electrically conductive film and patterning said electrically conductive film;
    a second step of forming a groove portion while leaving said resist mask remaining thereon by removing said insulator layer that is present in the interstice between said neighboring pixel electrodes;
    a third step of forming an insulating light absorber which is buried in said groove portion and in the interstice between said pixel electrodes and which covers the surface of said plurality of pixel electrodes; and
    a fourth step of exposing the surface of said pixel electrodes by removing at least said light absorber covering the surface of said resist mask and said resist mask.

2. A method for fabricating an electronic device according to claim 1, wherein in said fourth step, the light absorber buried in said groove portion and in the interstice between said pixel electrodes is left remaining therein.

3. A method for fabricating an electronic device according to claim 1, wherein in said fourth step, the light absorber buried in said groove portion and in the interstice between said pixel electrodes is left remaining therein, whereas the surface of said remaining light absorber is protruded from the surface of said pixel electrode.

4. A method for fabricating an electronic device according to claim 1, wherein in the second step, the side planes of the groove portion formed in said interlayer insulating layer is formed in such a manner that it approximately makes the same plane as the edge plane of said pixel electrodes.

5. A method for fabricating an electronic device according to claim 1, wherein said pixel electrodes are made from a metallic material.

6. A method for fabricating an electronic device according to claim 1, wherein said light absorber is made of an organic resin material containing a pigment or a carbon based material dispersed therein.

7. A method for fabricating an electronic device according to claim 1, wherein said light absorber is made of a silicon oxide based coated film containing a pigment or a carbon based material dispersed therein.

8. A method for fabricating an electronic device according to claim 1, wherein said light absorber comprises a material selected from a group of materials consisting of acrylic, polyimide, polyamide, polyamideimide, and epoxy resins.

* * * * *